United States Patent
Reinhardt

(10) Patent No.: US 9,960,827 B2
(45) Date of Patent: May 1, 2018

(54) ANALOG MULTIPLE BEAM FEED SYSTEMS AND METHODS

(71) Applicant: Raytheon Company, Waltham, MA (US)

(72) Inventor: Victor S. Reinhardt, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 0 days. days.

(21) Appl. No.: 15/098,934

(22) Filed: Apr. 14, 2016

(65) Prior Publication Data

US 2017/0302348 A1    Oct. 19, 2017

(51) Int. Cl.
*H04B 1/00*  (2006.01)
*H04B 7/06*  (2006.01)
*H04B 1/707* (2011.01)
*H04B 7/08*  (2006.01)

(52) U.S. Cl.
CPC ........... *H04B 7/0617* (2013.01); *H04B 1/707* (2013.01); *H04B 7/0691* (2013.01); *H04B 7/0874* (2013.01); *H04B 2201/70726* (2013.01)

(58) Field of Classification Search
CPC ................. H04B 7/0617; H04B 1/707; H04B 2201/70726
USPC ......... 375/146, 224; 370/328, 320; 455/13.3
See application file for complete search history.

(56) References Cited

U.S. PATENT DOCUMENTS 3,430,248 A    2/1969   Lightbowne
5,077,562 A   12/1991   Chang et al.
6,683,392 B2   1/2004   Reinhardt et al.
6,919,988 B2   7/2005   Cook
(Continued)

FOREIGN PATENT DOCUMENTS

WO    WO 2008/112454 A1    9/2008

OTHER PUBLICATIONS

Alwan, et al. "Low Cost, Power Efficient, On-Site Coding Receiver (OSCR) for Ultra-Wideband Digital Beamforming". The Electroscience Laboratory, The Ohio State University, Jan. 1, 2013. pp. 201-206 (5 pages).
(Continued)

*Primary Examiner* — Chieh M Fan
*Assistant Examiner* — Fitwi Hailegiorgis
(74) *Attorney, Agent, or Firm* — Daly, Crowley, Mofford & Durkee, LLP

(57) ABSTRACT

The present disclosure is directed towards an analog beamformer multiple beam feed (MBF). The analog beamformer MBF comprises a plurality of encoder elements to receive radiofrequency (RF) signals and generate coded analog signals. The RF signals may be coded using code division multiple access (CDMA) codes. The analog beamformer MBF further comprises a combiner to combine the coded analog signals received from the plurality of encoder elements and a divider to receive the combined coded analog signals and generate a plurality of coded analog outputs. The analog beamformer MBF further comprises a plurality of decoder elements to receive the plurality of coded analog outputs and generate decoded analog signals. In some embodiments, the RF signals may be decoded using CDMA codes. The analog beamformer MBF further comprises a plurality of beamformer elements configured to generate beam outputs corresponding to the decoded analog signals.

20 Claims, 4 Drawing Sheets

(56) References Cited

U.S. PATENT DOCUMENTS

| | | | | |
|---|---|---|---|---|
| 7,068,617 | B1* | 6/2006 | Mahant-Shetti | H04B 1/707 370/320 |
| 2004/0259497 | A1* | 12/2004 | Dent | H04B 7/18515 455/13.3 |
| 2009/0103593 | A1* | 4/2009 | Bergamo | H04B 1/707 375/146 |
| 2010/0063399 | A1* | 3/2010 | Walker | G01N 29/0654 600/459 |
| 2013/0070677 | A1* | 3/2013 | Chang | G01S 13/9303 370/328 |
| 2014/0146863 | A1* | 5/2014 | Seol | H04B 7/0456 375/224 |
| 2015/0234030 | A1 | 8/2015 | Marr et al. | |
| 2015/0349914 | A1 | 12/2015 | Schulte, Jr. et al. | |
| 2016/0057364 | A1 | 2/2016 | Cook | |

OTHER PUBLICATIONS

Alwan, et al. "Ultra-Wideband On-Site Coding Receiver (OSCR) for Digital Beamforming Applications". The Electroscience Laboratory, The Ohio State University, Jan. 1, 2013. pp. 620-621 (2 pages).

Clos, Charles. "A Study of Non-Blocking Switching Networks". The Bell System Technical Journal, Mar. 1953. pp. 406-424 (19 pages).

Panduro, et al. "Simplifying the Feeding Network for Multi-Beam Circular Antenna Arrays by Using Corps". Progress in Electromagnetics Research Letters, vol. 2. Jan. 1, 2011. pp. 119-128 (10 pages).

Invitation to pay additional fees and partial search report dated May 19, 2017 from International App. No. PCT/US2017/018849; 16 Pages.

Horlick; "Discrete Time Analog Signal Processing Devices"; Analytical Chemistry; vol. 48; No. 9; pp. 783 A-787 A; Aug. 1976; 5 Pages.

Petrou, et al.; "An Imaging Architecture Based on Derivative Estimation Sensors"; Progress in Pattern Recognition, Image Analysis, Computer Vision, and Applications; pp. 3-18; 2009; 16 Pages.

Strasilla; "Analog Devices on One Chip"; Multiple-Valued Logic; pp. 269-272; May 25, 1976; 4 Pages.

PCT International Search Report & Written Opinion of the ISA dated Jul. 25, 2017 from International Application No. PCT/US2017/018849; 22 Pages.

\* cited by examiner

ANALOG MULTIPLE BEAM FEED SYSTEMS AND METHODS

BACKGROUND

As is known in the art, there is a class of microwave antennas referred to as Multiple Beam Antennas (MBAs). Receive MBAs use reflectors and lenses to provide large antenna apertures with relatively low element count Multiple Beam Feeds (MBFs) to provide multiple beam outputs with electronic steering. MBFs produce this electronic steering by electronically changing interconnects between multiple radiating elements that do not cover the full antenna aperture and multiple beams. MBA MBFs have much lower element counts than those of equivalent aperture direct radiating electronically steered antennas (ESAs), which have elements that cover the full antenna aperture.

There are two types of MBFs, a first type having analog beamformers and a second type having digital beamformers. With respect to the first type, the circuitry of MBFs having analog beamformers can be very complex. Analog MBF's may use either a complex microwave matrix switch (MSM) approach or a complex phased array feed (PAF) approach to electronically change interconnects between elements and beams. In a system having 1270 antenna elements, for example, the MSM approach may use 100,000-200,000 microwave switches, 80 microwave power summers (e.g., 1270:1 power summers), 1,270 microwave power dividers (e.g., 1:80 power dividers), and a complex microwave interconnect topology. The PAF approach may use 5,080 phasors and attenuators, and 4 element summing manifolds (e.g., 1270:1 summing manifolds). Thus, both the MSM approach and the PAF approach require large analog components counts and complex topologies, which increase the size, weight, DC power, and cost of such MBF's.

SUMMARY

The present disclosure is directed towards analog code division multiple access (CDMA) techniques to reduce the component complexity of an analog beamformer multiple beam feed (MBF). Such an MBF can include input elements with associated low noise amplifiers (LNAs) and analog CDMA modulators, a passive element to beam routing manifold, output beam analog CDMA demodulators and summation manifold to reduce the component complexity of the analog beamformer system. The CDMA modulators (encoders) and CDMA demodulators (decoders) eliminate the need for much more complex microwave matrix switches (MSMs) or complex phased array feeds (PAFs) to actively change interconnects between elements and beams. Accordingly, with this particular arrangement, an analog MBF having reduced circuitry and thus reduced complexity is provided.

In some embodiments, the analog beamformer system may include a plurality of antenna elements with associated low noise amplifiers (LNAs) and CDMA encoders, however with only a portion of the element LNAs and encoders being active at any one time to accommodate the reduced number of elements actually used in the output beamforming.

In one embodiment of an analog beamformer system designed using the analog CDMA techniques described herein, the following analog beamformer system may be provided. The analog beamformer system may have N total antenna elements including associated RF chain amplifiers and CDMA encoders, B desired electronically steered and shaped beams, and D analog elements used in forming each beam. With BD number of antenna elements, amplifiers and encoders activated, the remaining antenna element assemblies may be inactive. In some embodiments, CDMA encoding of the antenna element RF signal may include a mixer acting as a bi-phase modulator (at the antenna RF) driven by a digital integrated circuit (e.g., control application specific integrated circuit (ASIC) or a field programmable gate array (FPGA)) generating an orthogonal CDMA code. In some embodiments, the code chip length may be L where L is the smallest positive integer greater or equal to $(\log_2(BD+1))$ in order to orthogonally encode all BD active elements and the chip rate ($R_c$) of this code may be 2L times the analog bandwidth of the antenna signal in order to satisfy the Nyquist criterion for decoding this analog signal. In some embodiments, the summed RF signal can be provided to a down-converter to convert the summed RF signal to an intermediate frequency (IF). In other embodiments, the summed RF signal may not be converted to an intermediate frequency (IF) and instead the summed RF signal may be provided directly to a divider. In an embodiment, the summed analog signal (e.g., summed IF signal, summed RF signal) can be split into BD number of outputs. Each of these outputs can be analog decoded using a mixer demodulator and a discrete time analog processing (DTAP) filter to recover the individual BD element signals. Finally, the decoded analog signals can be sent to D-element number of analog beamformers to produce the B number of beam outputs.

Thus, for the MSM approach described above, the following elements may be eliminated using the analog CDMA techniques described herein: 100,000-200,000 microwave switches, 80 microwave power summers (e.g. 1270:1 power summers), 1,270 microwave power dividers (e.g. 1:80 power dividers), and a complex microwave interconnect topology. For the PAF approach described above, the following elements may be eliminated using the analog CDMA techniques described herein: 5,080 element phasors and attenuators, and 4 element summing manifolds (e.g. 1270:1 summing manifolds).

In one aspect, the present disclosure is directed towards an analog beamformer system. The analog beamformer system includes a plurality of encoder elements to receive RF signals and generate coded analog signals. The RF signals may be coded using code division multiple access (CDMA) codes such as pseudorandom codes such as Gold codes, Walsh-Hadamard codes, or other similar codes. The analog beamformer system includes a combiner to combine the coded analog signals received from the plurality of encoder elements and a divider to receive the combined coded analog signals and generate a plurality of coded analog outputs. The analog beamformer system includes a plurality of decoder elements to receive the plurality of coded analog outputs and generate decoded analog signals. The RF signals may be decoded using CDMA codes. The analog beamformer system includes a plurality of beamformer elements configured to generate beam outputs corresponding to the decoded analog signals.

In some embodiments, the system may include a plurality of antenna elements coupled to the plurality of encoder elements. The plurality of antenna elements can be configured to receive the RF signal and a predetermined number of the plurality of antenna elements can be active. The predetermined number of active antenna elements may correspond to a number of beamformer elements and a number of beam outputs. In some embodiments, a total number of the plurality of encoder elements corresponds to a number of beamformer elements and a number of beam outputs.

In some embodiments, each of the encoder elements may be a bi-phase encoder. Each of the encoder elements may include a mixer coupled to an application specific integrated circuit (ASIC), field programmable gate array (FPGA), or other similar digital circuit device. The mixer can have a first input to receive at least one RF signal and a second input to receive CDMA codes from the ASIC. In some embodiments, the mixer can include a low noise amplifier coupled to a 180 degree hybrid coupler. The ASIC may generate orthogonal CDMA codes.

In some embodiments, the system may include a dowconverter module disposed between the combiner and the divider. The dowconverter module can be configured to receive the combined coded analog signals from the combiner and convert the combined coded analog signals to an IF signal. In some embodiments, the divider can be configured to receive the IF signal from the downconverter module and generate the coded analog outputs based on the IF signal.

In some embodiments, each of the decoder elements may be an analog DTAP encoder. Each of the decoder elements may include a mixer coupled to an ASIC. The mixer can have a first input to receive at least one coded analog signal and a second input to receive CDMA codes from the ASIC. In an embodiment, the number of decoded analog signals may correspond to a number of beamformer elements and a number of beam outputs.

In some embodiments, the system may include a sample and hold module coupled to an output of the mixer and a weighted sum module coupled to the sample and hold module. In an embodiment, the system may include a phase-shifter circuit disposed between the plurality of decoder elements and the plurality of beamformers elements.

In another aspect, the present disclosure is directed towards a method for multiple beam feeds. The method may include receiving a plurality of RF signals through a plurality of antenna elements. In some embodiments, a predetermined number of the plurality of antenna elements can be active and a predetermined number of the plurality of antenna elements can be inactive. The method may include encoding the RF signals using CDMA codes to generate coded analog signals, combining the coded analog signals, and splitting the combined coded analog signals into a number of coded analog outputs. The number of coded analog outputs may correspond to the number of active antenna elements. The method may further include decoding the coded analog outputs using CDMA codes to generate decoded analog signals and generating beam outputs corresponding to the decoded analog signals.

In some embodiments, the method may include performing bi-phase modulation on the received RF signals. The RF signals may be modulated using CDMA codes. In some embodiments, the RF signals may be encoded using orthogonal CDMA codes.

In an embodiment, the method may include converting the combined coded analog signals to an IF signal. The IF signal may be received by a divider element and the divider element can be configured to generate coded analog outputs based on the IF signal.

In some embodiments, the method may include performing analog discrete time analog processing on the coded analog outputs. The coded analog outputs may be demodulated using CDMA codes. In some embodiments, the method may include performing sample and hold techniques on the decoded analog signals.

BRIEF DESCRIPTION OF THE DRAWINGS

The foregoing features may be more fully understood from the following description of the drawings in which.

DETAILED DESCRIPTION

Figure 1:
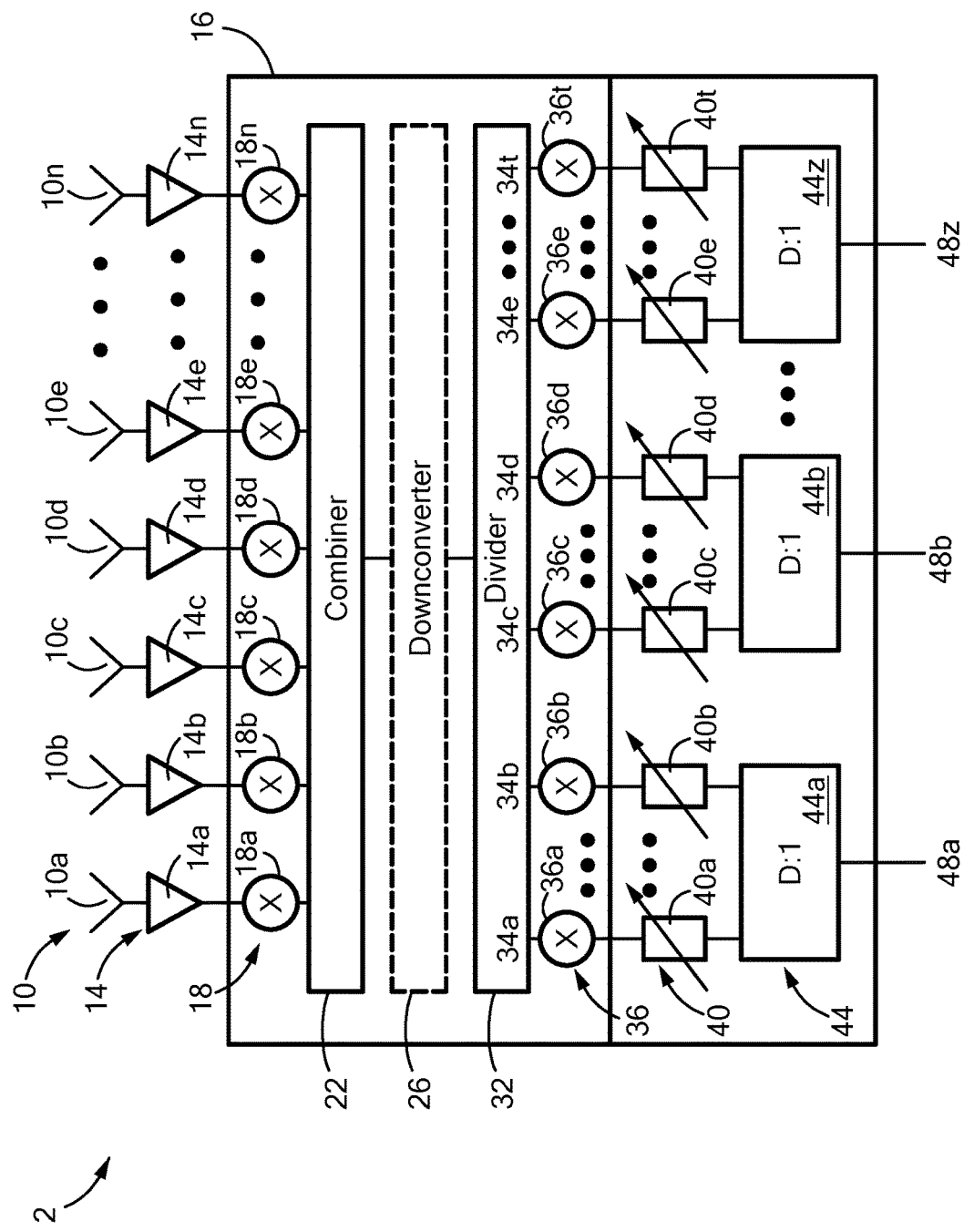
FIG. 1 is a block diagram of an analog beamformer multiple beam feed.

Now referring to FIG. 1, a receive implementation of a switchless analog beamformer multiple beam feed (MBF) 2 includes a plurality of antenna elements 10$a$-10$n$, each having an output coupled to each input of a plurality of n low noise amplifiers (LNAs) 14$a$-14$n$. The output of each LNA is coupled to each of m inputs of a switchless analog beamformer circuit 16. The switchless analog beamformer circuit 16 includes a plurality of encoder elements 18$a$-18$n$ at each beamformer input, an n to 1 RF combiner 22, an optional single RF to IF downconverter, a 1 to t divider 32, a plurality of decoder elements 36$a$-36$t$, a plurality of weighting circuits 40$a$-40$t$, and a plurality of beamformers 44$a$-z.

In the illustrative embodiment of FIG. 1, each LNA antenna element 14$a$-14$n$ is coupled to a respective one of the encoder elements 18$a$-18$n$. The output of each encoder element 18$a$-18$n$ is coupled to an input of a combiner 22. The output of the combiner 22 is coupled to an input of an optional downconverter module 26. The output of the downconverter module 26 is coupled to an input of a divider 32. In embodiments, which do not include downconverter 26, combiner 22 can be coupled directly to divider 32.

The divider may have a plurality of outputs 34$a$-34$t$, each of which can be coupled to one input of a plurality of decoder elements 36$a$-36$t$. In the illustrative embodiment of FIG. 1, each output 34$a$-34$t$ of the divider 32 is coupled to a respective one of the decoder elements 36$a$-36$t$. The outputs of each decoder element 36-36$t$ is coupled to one input of one of a plurality of weighting circuits 40$a$-40$t$.

In an embodiment, the output of each weighting circuit 40$a$-40$t$ is coupled to one input of one of a plurality of beamformers 44$a$-44$z$. In the illustrative embodiment of FIG. 1, the outputs of two weighting circuits out of the plurality of weighting circuits 40$a$-40$t$ are coupled to two inputs of one of the beamformers 44$a$-44$z$ such that z=t/2. However, it should be appreciated that in other embodiments, y weighting circuits 40 may be connected to each beamformer 44 such that z=t/y. Each of the beamformers 44$a$-44$z$ may have one beam output 48$a$-48$z$.

It should be appreciated that in describing the above elements, the plurality of antenna elements 10$a$-10$n$ may generally be referred to herein as antenna elements 10, the plurality of LNAs 14$a$-14$n$ may generally be referred to herein as LNAs 14, the plurality of encoder elements 18$a$-18$n$ may generally be referred to herein as encoder elements 18, the plurality of decoder elements 36$a$-36$t$ may generally be referred to herein as decoder elements 36, the plurality of weighting circuits 40a-40t may generally be referred to herein as weighting circuits 40, the plurality of beamformers 44a-44z may generally be referred to herein as beamformers 44 and the plurality of beam outputs 48a-48z may generally be referred to herein as beam outputs 48.

The analog MBF 2 can include a plurality of RF chains. Each RF chain corresponds to a signal path from an antenna element 10 to an output 48 of a beamformer 44 circuit (e.g., each RF chain includes one antenna element 10, one LNA 14, one encoder element 18, a portion of the combiner module 22, a portion of the divider 32, at least one decoder element 36, at least one weighting circuit 40 and at least one beamformer 44. Routing of such RF chains to electronically change interconnects can be determined by selecting a CDMA code at the decoder element 36 that matches the desired antenna element 10 and encoder element 18 CDMA code rather than by switching interconnects.

In some embodiments, a predetermined number of LNAs 14 and encoder elements 18 may be powered on. For example, in an embodiment, only t out of n predetermined number of antenna elements 10LNAs 14 and encoder elements 18 may be powered on to save DC power, since only t such devices participate in forming the z beams of beamformers 44.

An output of each of the antenna elements 10 may be coupled to an input of one LNA 14 or other amplifier circuits capable of amplifying the received RF signal with minimal signal-to-noise degradation.

An output of each of the LNAs 14 may be coupled to a first input of an encoder element 18. The encoder elements 18 are configured to receive RF signals from the LNAs 14 (or antenna elements 10) and generate CDMA coded analog signal outputs. Each encoder element 18 may include a code producing circuit to generate pseudorandom codes such as Gold codes, Walsh-Hadamard codes, or similar orthogonal or near orthogonal codes and a bi-phase modulator to encode the RF signals. The encoder element 18 will be discussed in greater detail below with respect to FIGS. 2A-2B.

An output of each of the encoder elements 18 may be coupled to an input of the combiner 22, which passively sums together all encoder element 18 input signals to produce a single output signal, thereby simplifying later interconnections.

In some embodiments, an output of the combiner 22 may be coupled to an input of the downconverter module 26. The downconverter module 26 may be disposed between the combiner 22 and the divider module 32. The downconverter module 26 may be configured to receive the single analog signal output (i.e., combined coded analog signal) from the combiner 22 and convert the single analog signal output to an intermediate frequency (IF) signal to enable RF band tuning of the antenna with a fixed intermediate frequency (IF) in later circuitry.

Alternatively, in some embodiments, the analog beamformer MBF 2 may not include the downconverter module 26 and thus the output of the combiner 22 may be coupled to the input of the divider 32. The divider 32 may receive the combined RF signal from the combiner 22.

The divider 32 can be configured to receive the combined coded analog signal (either an IF signal or an RF signal) and generate a plurality of coded analog outputs. In some embodiments, the divider 32 may be a passive divider circuit that divides the combined analog signal into a plurality of analog signals. The coded analog outputs may be RF signals or IF signals.

The divider 32 may have a plurality of outputs 34. In some embodiments, the number of the coded analog outputs generated may correspond to the number of active antenna elements 10 in the analog beamformer MBF 2. For example, in one embodiment, having B number of desired electronically steered and shaped beams, and D number of beamformers, the number of outputs 34 may be B*D. Each of the outputs 34 of the divider 32 may then be coupled to one input of a decoder element 36.

The decoder elements 36 can be configured to receive the coded analog outputs and generate decoded analog signals. In some embodiments, each of the decoder elements 36 may be coupled to a CDMA demodulator and CDMA code generator (both not shown in FIG. 1). In such embodiments, the CDMA code generator can select a desired antenna element 10 signal and reject the other antenna element 10 signals in the combined signal input by matching the decoding CDMA code to the encoding CDMA code of the desired antenna element 10. Thus, the interconnection between the desired antenna element 10 and decoder element 36 in question is changed electronically without a complex MSM or PAF. The decoder element 36 will be discussed in greater detail below with respect to FIG. 3.

In an embodiment, an output of each of the decoder elements 36 may be coupled to an input of a weighting circuit 40. As illustrated in FIG. 1, each of the weighting circuits 40 can be disposed between the plurality of decoder elements 36 and the plurality of beamformers 40. The weighting circuits 40 may be analog phase-shifter circuits. For example, in some embodiments, the weighting circuits 40 may include phase-shifters or variable delays and attenuator circuits. The weighting circuits 40 can be configured to provide a variable weighting for an inputted decoded signal before summation in the beamformer 44.

An output of each of the weighting circuits 40 may be coupled to an input of at least one beamformer 44. In some embodiments, each beamformer 44 may be coupled to outputs of one or more weighting circuits 40. For example, and as illustrated in FIG. 1, each beamformer 44 is coupled to the outputs of two weighting circuits 40.

In an embodiment, each beamformer 44 has at least one beam output 48. The beam outputs 48 can be electronically steered and shaped beams. It should be appreciated that although FIG. 1 illustrates three beamformers, the number of beamformers 44 may be selected based on a particular application of the analog beamformer MBF 2 and a desired number of outputs 48.

It should be appreciated that in the illustrative embodiment of FIG. 1, each antenna element 10 is coupled to a respective one of the LNAs 14, each LNA antenna element 14 is coupled to a respective one of the encoder elements 18, each output 34 of the divider 32 is coupled to a respective one of the decoder elements 36, each decoder element 36 is coupled to a respective one of the weighting circuits 40 and two weighting circuits 40 are coupled to a respective one of the beamformers 44.

It should, however, be appreciated that in other embodiments this need not be so. In some embodiments, the number of elements in one level of a DF system may vary from the number of elements in a preceding and/or subsequent level in the DF system (e.g., not a 1:1 ratio between different elements). A DF system may have various combinations (ratios between different elements) of each of the above described elements based on a particular application of the DF system. For example, multiple antenna elements 10 could be coupled to a single LNA 14. Additionally or alternatively, multiple LNAs 14 could be coupled to a single encoder element 18. Additionally or alternatively, multiple outputs 34 could be coupled to a single decoder element 36.

Additionally or alternatively, multiple decoder elements 36 could be coupled to a single weighting circuit 40. Additionally or alternatively, a single weighting circuit 40 could be coupled to a single beamformer 44.

It should be appreciated that although FIG. 1 illustrates a receiver system, the systems and methods described herein, such as analog beamformer MBF 2, may be used as a transmitter system. For example, in some embodiments, the analog beamformer MBF 2 may be configured to transmit a signal as well as receive a signal.

Figure 2A:
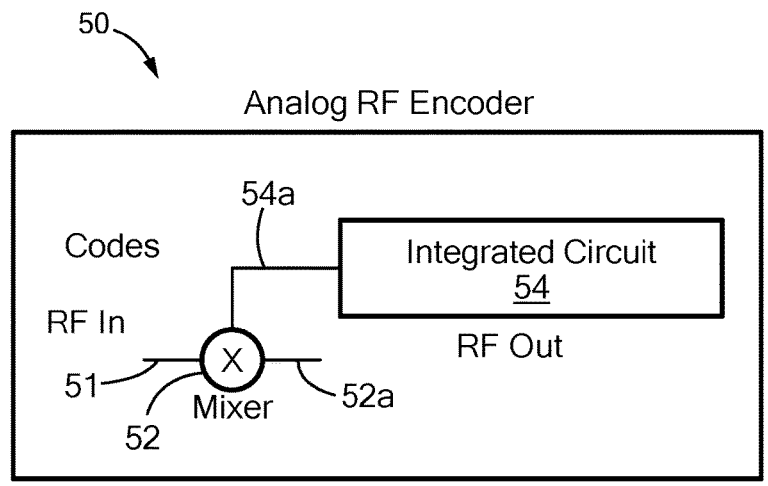
FIG. 2A is a block diagram of an illustrative embodiment of an encoder element of the analog beamformer multiple beam feed of FIG. 1.

Now referring to FIG. 2A, an encoder 50 includes a mixer 52 and an integrated circuit 54. In an embodiment, encoder 50 may be the same or substantially similar to the encoder elements 18 described above with respect to FIG. 1.

In an embodiment, the mixer 52 can have multiple inputs. The mixer 52 can be configured to combine the input signals and produce a modulated output signal. For example and as illustrated in FIG. 2A, the mixer 52 can receive an RF signal through a first input 51 and a local oscillator (LO) signal from the integrated circuit 54 through a second input 54a. The RF signal 51 may be received from one or more antenna element or LNAs, such as antenna elements 10 or LNAs 14 described above with respect to FIG. 1. The LO signal 54a may be a coded signal used to generate a coded analog signal. The mixer 52 can be configured to generate the modulated output signal 52a based on the RF signal 51 and the LO signal 54a. The modulated output signal 52a may be a coded analog signal.

In an embodiment, the integrated circuit 54 can be a control application specific integrated circuit (ASIC) or a microchip configured to generate and provide a coded output signal 54a. In some embodiments, the integrated circuit 54 is configured to generate CDMA codes. In some embodiments, the CDMA codes may be orthogonal CDMA codes. For example, in one embodiment, the CDMA codes can be "Hadamard" codes (also referred to as Walsh-Hadamard codes or more simply Walsh codes) formed from a plurality of rows of Hadamard matrices. The integrated circuit 54 can be configured to provide the coded signals 54a to the mixer 52 to combine with the received RF signal. Thus, the encoder 50 can be configured to generate coded analog signals.

Figure 2B:
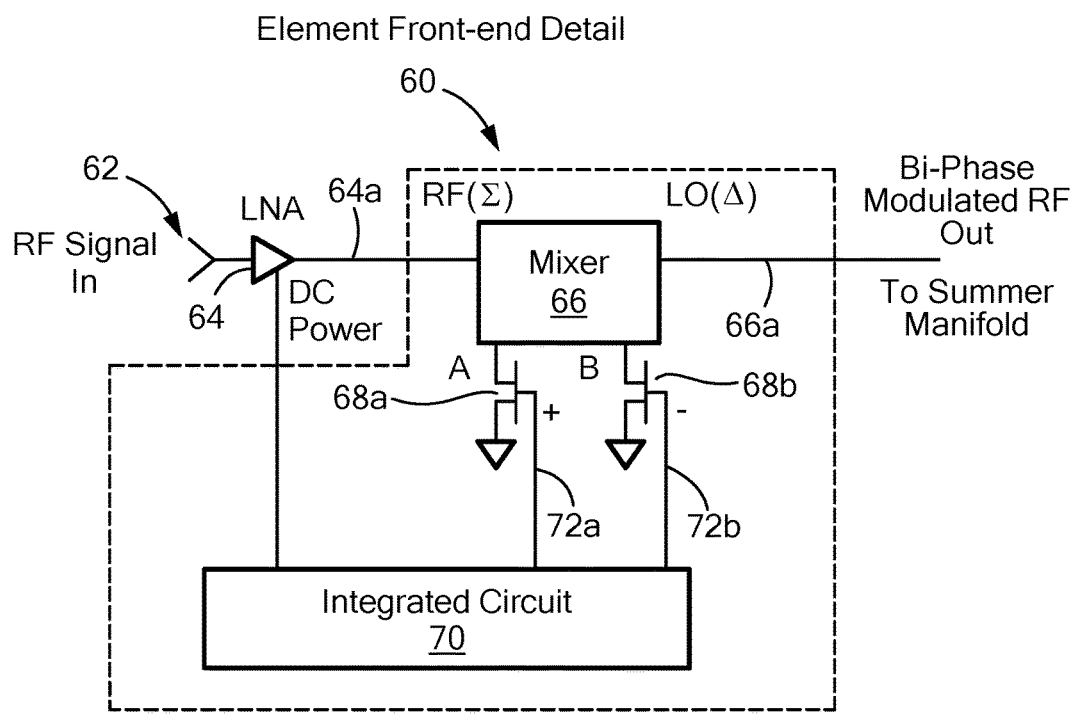
FIG. 2B is a circuit diagram of an illustrative embodiment of an encoder portion of the analog beamformer multiple beam feed of FIG. 1.

Now referring to FIG. 2B, an encoder 60 is coupled to an antenna element 62 and an LNA 64. In an embodiment, the encoder 60, antenna element 62 and LNA 64 may form a first part or front end of an analog beamformer MBF, such as analog beamformer MBF 2 described above with respect to FIG. 1.

In an embodiment, the antenna element 62 can be configured to receive an RF signal. The antenna element 62 can include one or more radiators or conductive elements. The antenna element 62 may be the same or substantially similar to the antenna elements 10 described above with respect to FIG. 1.

An output of the antenna element 62 is coupled to an input of the LNA 64 and the antenna element 62 can be configured to provide the RF signal to the LNA 64. The LNA 64 may include various types of LNA devices or amplifier devices. The LNA 64 may be the same or substantially similar to the LNAs 14 described above with respect to FIG. 1. In some embodiments, the LNA 64 may be a monolithic microwave integrated circuit (MMIC) LNA.

An output of the LNA 64 is coupled to an input of the encoder 60. In an embodiment, the LNA 64 is configured to produce can LNA output signal 64a and provide the LNA output signal 64a to the encoder 60.

In an embodiment, the encoder 60 includes a mixer 66, a first transistor 68a, a second transistor 68b and an integrated circuit 70. The encoder 60 may be the same or substantially similar to the encoder elements 18a-18n described above with respect to FIG. 1.

The mixer 66 may include various types of nonlinear coupler devices. In some embodiments, the mixer 66 may include a 180 degree hybrid coupler. In other embodiments, the mixer 66 may include a MMIC 3-bit phasor. The mixer 66 can have multiple inputs. For example and as illustrated in FIG. 2B, a first input to the mixer 66 is coupled to the output of the LNA 64, a second input of the mixer 66 is coupled to an output of the first transistor 68a, and a third input of the mixer 66 is coupled to an output of the second transistor 68b. The mixer 66 can receive the RF signal from the LNA 64 and a local oscillator (LO) signal from the integrated circuit 70 through one or both of the first and second transistors 68a, 68b. The mixer 66 can be configured to generate a modulated output signal based on the RF signal and the LO signal. In some embodiments, the modulated output signal can be at a new or different frequency from a frequency of the signals input to the mixer 66. In some embodiments, the mixer 66 can be configured to generate a bi-phase modulated output 66a.

In an embodiment, the integrated circuit 70 may be the same or substantially similar to the integrated circuit 54 described above with respect to FIG. 2A. The integrated circuit 70 may be a control ASIC. The integrated circuit 70 can be configured to generate CDMA codes. The integrated circuit 70 can be configured to transmit the coded signal 72a, 72b to the mixer 66 through one of or both the first and second transistors 68a, 68b. In an embodiment, a gate terminal of each of the first and second transistors 68a, 68b may be coupled an output of the integrated circuit 70 to receive a coded signal 72a, 72b respectively from the integrated circuit 70. A drain terminal of each of the first and second transistors 68a, 68b may be coupled to an input of the mixer 66 to provide the coded signal 72a, 72b to the mixer 66. A source terminal of the each of the first and second transistors 68a, 68b may be coupled to a reference voltage (i.e., ground).

In some embodiments, the first and second transistors 68a, 68b may be field effect transistors (FET). In other embodiments, the first and second transistors 68a, 68b may be replaced by a pair of diodes disposed between the coupler 66 and the integrated circuit 70 and configured to perform a switch function.

The mixer 66 can be configured to generate coded analog signals 66a. Thus, an output of the encoder 60 can correspond to the output of the mixer 66 and the encoder 60 can be configured to generate coded analog signals 66a.

Figure 3:
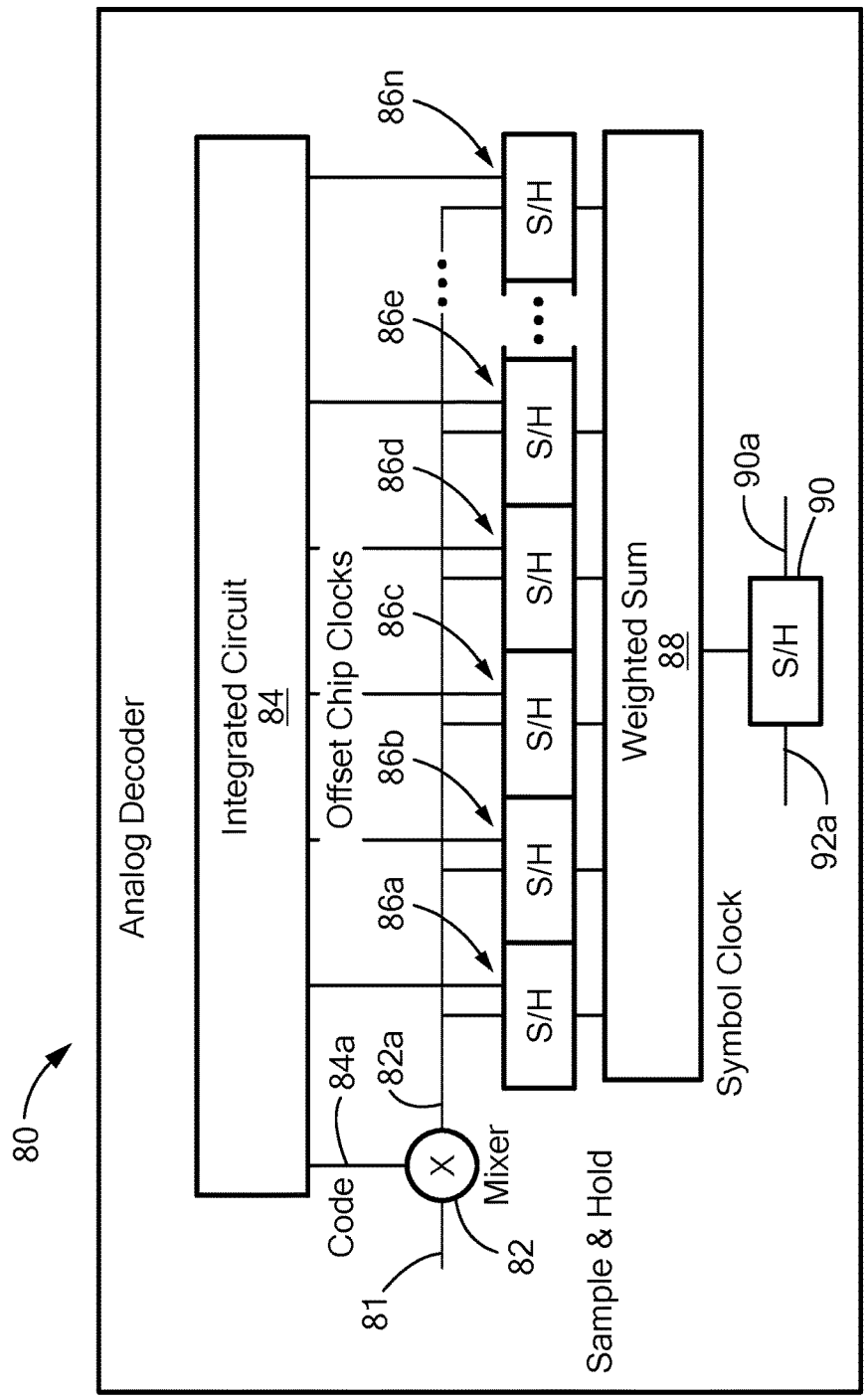
FIG. 3 is a block diagram of an illustrative embodiment of a decoder element of the analog beamformer multiple beam feed of FIG. 1.

Now referring to FIG. 3, an analog decoder 80 includes a mixer 82, an integrated circuit 84, a plurality of sample and hold circuits 86a-86n and 90a, and a weighted sum circuit 88. In an embodiment, decoder 80 may be the same or substantially similar to the decoder elements 36 described above with respect to FIG. 1. The decoder 80 may be an analog discrete time analog processing (DTAP) filter.

In an embodiment, the mixer 82 can be configured to receive at least two inputs. A first input 81 may be a coded analog signal (e.g., a coded analog output from the divider 32 of FIG. 1). In some embodiments, the coded analog signal 81 may be an RF signal. In other embodiments, the coded analog signal 81 may be an IF signal. A second input 84a to the mixer 82 may be a LO signal (e.g., coded signal) from the integrated circuit 84. In some embodiments, the integrated circuit 84 can be a control ASIC configured to generate CDMA codes. The integrated circuit 84 can be configured to provide coded signals to the mixer 84 are part of the LO signal 84a.

The mixer 82 can be configured to generate a decoded analog signal based on the received coded analog signal 81 and the LO signal 84a. In some embodiments, the mixer 82 can be configured to generate a demodulated output 82a. In an embodiment, the demodulated output 82a can be provided to a plurality of sample and hold circuits 86a-86n. In the illustrative embodiment of FIG. 3, six sample and hold circuits are provided that receive the demodulated output 82a from the mixer 82, however it should be appreciated that the number of sample and hold circuits may vary based on a particular application of the decoder circuit 80 and a desired output of the decoder circuit 80.

In some embodiments, each of the sample and hold circuits 86a-86n can be configured to sample the demodulated output signal 82a and hold it at a constant level for a specified minimum period of time. In one embodiment, each of the sample and hold circuits 86a-86n can be configured to receive the demodulated output signal 82a and turn it into a discrete time signal or samples of a discrete time signal based on the specified minimum period of time.

For example, each of the sample and hold circuits 86a-86n can be coupled to the integrated circuit 84 to receive clock signals. Thus, the sample and hold circuits 86a-86n can generate the samples of the discrete time signal based on an application of the clock signals from the integrated circuit 84.

An output of each of the sample and hold circuits 86a-86n can be coupled to the weighted sum circuit 88. The weighted sum circuit 88 can be configured to generate a weighted sum of the output of the sample and hold circuits 86a-86n. In some embodiments, the weighted sum circuit 88 can be configured to generate a signal that corresponds to an average of the each of the outputs of the sample and hold circuits 86a-86n.

An output 88a of the weighted sum circuit 88 can be coupled to an input of sample and hold circuit 90. The sample and hold circuit 90 may also be coupled to a clock signal 92a. In some embodiments, the clock signal 92a may be provided by the integrated circuit 84. The sample and hold circuit 90, based on the output of the weighted sum circuit 88 and the clock signal 92a, can be configured to generate samples 90a of a discrete time signal. In some embodiments, the samples correspond to decoded analog signals. In an embodiment, the decoder 80 can be configured to generate decoded analog signals.

Figure 4:
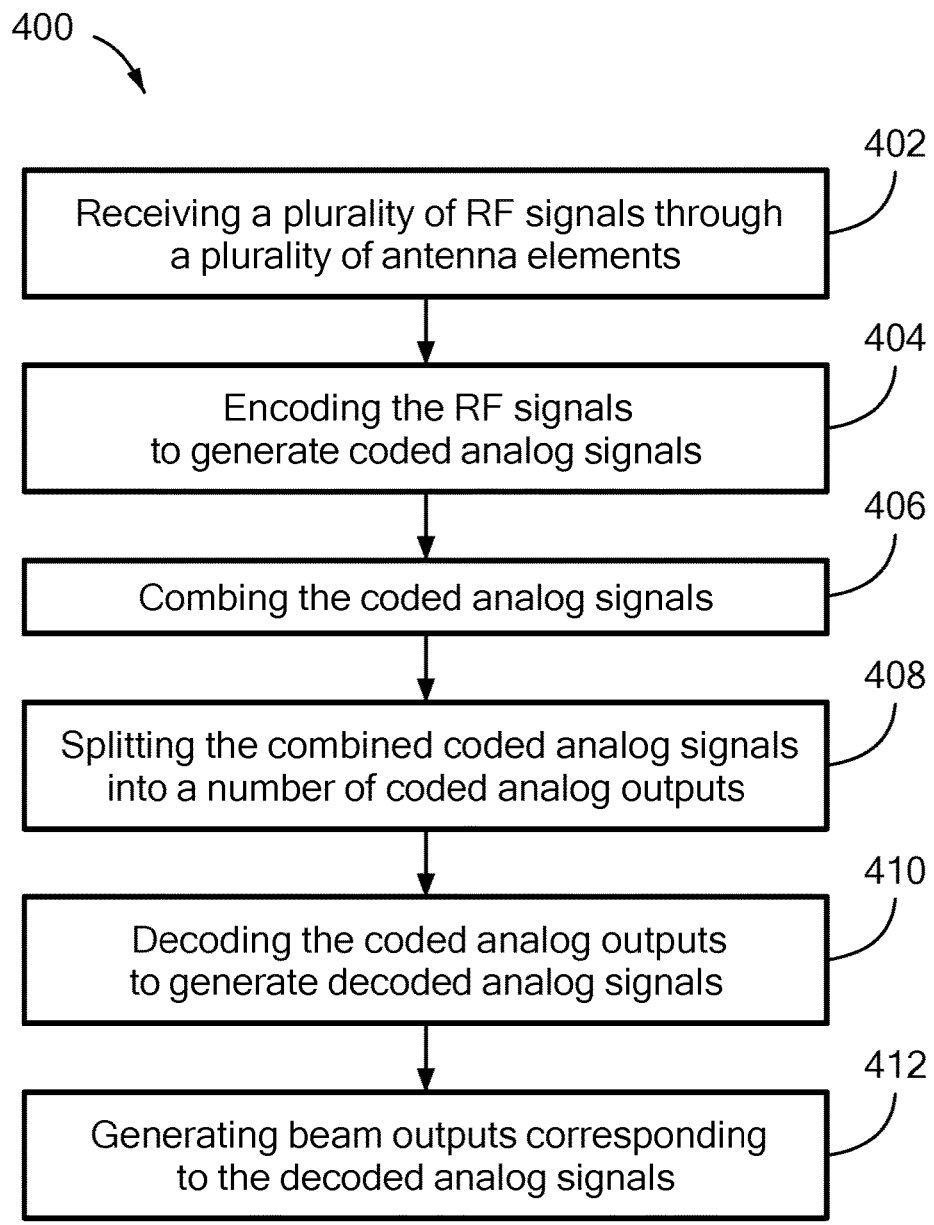
FIG. 4 is a flow diagram of a method for generating beam outputs with an analog beamformer.

Now referring to FIG. 4, a flow diagram of a method 400 for generating beam outputs with an analog beamformer MBF is provided. First, at block 402, a plurality of RF signals can be received by a plurality of antenna elements, such as by antenna elements 10 described above with respect to FIG. 1. The antenna elements may form the first portion of an analog beamformer MBF (i.e., analog beamformer system).

In an embodiment, not all of the antenna elements may be active at single time. For example, only a portion of the plurality of antenna elements may be active. The remaining antenna elements may be inactive. Each of the antenna elements may include a switch or other means for effectively connecting or disconnecting a signal path between a respective antenna element and remaining portions of the analog beamformer, thus making the antenna element active or inactive respectively.

The number of active antenna elements may be selected based on the number of desired outputs of the system (e.g., electronically steered and shaped beams) and a number of beamformers in the system. For example, in one embodiment, having N number of antenna elements, B number of desired beams, and D number of beamformers, the system may have B*D number of the N antenna elements active. Each of the antenna elements may be coupled to an encoder element, such as encoder elements 18 described above with respect to FIG. 1. The antenna elements may be configured to transmit the RF signal to the encoder element. In some embodiments an LNA may be disposed on a signal path between the output of an antenna element and an input of an encoder element, such as LNAs 14 described above with respect to FIG. 1. Thus, the antenna elements may be configured to transmit the RF signal to the encoder element through the LNA.

At block 404, the RF signals can be encoded to generate coded analog signals. In an embodiment, the encoder element can include a mixer and an integrated circuit (e.g., mixers 52, 66 and IC 54, 70 of FIGS. 2A-2B), such as a control ASIC or an FPGA. The mixer can be configured to receive the RF signals through a first input. A second input of the mixer can be coupled to the integrated circuit. The integrated circuit can provide a local oscillator (LO) signal to the mixer. In an embodiment, the mixer can be configured to combine the RF signal with the LO signal and perform bi-phase modulation on the RF signals.

In some embodiments, the integrated circuit provides CDMA codes in the LO signal and the RF signals can be encoded using the CDMA codes to generate the coded analog signals. Thus, the RF signals can be modulated using the CDMA codes. In some embodiments, the CDMA codes can be orthogonal CDMA codes.

At block 406, the coded analog signals can be combined. In some embodiments, the encoder element is coupled to a combiner, such as combiner 22 described above with respect to FIG. 1. The combiner can be configured to combine the coded analog signals into a single analog signal. In some embodiments, the combiner may be a passive summer circuit.

An output of the combiner may be coupled to a downconverter circuit, such as downconverter 26 described above with respect to FIG. 1. The downconverter circuit can be configured to convert the combined coded analog signals (i.e., RF signal) to an IF signal. In other embodiments, the combiner may provide the combined coded analog signals as an RF signal directly to a divider.

At block 408, the combined coded analog signals can split into a number of coded analog outputs. In an embodiment, a divider, such as divider 32 described above with respect to FIG. 1, can be configured to receive the combined coded analog signals and generate a number of coded analog outputs. The coded analog outputs may be RF signals or IF signals, depending on the frequency of the signal received at the divider. In some embodiments, the divider may be a passive divider circuit having a plurality of outputs. The number of outputs generated may correspond to the B number of desired beams, and D number of beamformers in the system. Thus, in some embodiments, the divider may have B*D outputs.

At block 410, the coded analog outputs can be decoded to generate decoded analog signals. In an embodiment, at least one decoder element can be coupled to at least one of the outputs of the divider. The decoder elements may include a mixer (e.g., mixer 82 of FIG. 1) and an integrated circuit, such as a control ASIC or FPGA (e.g., IC 84 of FIG. 1). The mixer can be configured to receive the coded analog outputs through a first input. A second input of the mixer can be coupled to the integrated circuit. The integrated circuit can provide an LO signal to the mixer. In an embodiment, the mixer can be configured to combine the coded analog outputs with the LO signal and perform demodulation on the analog signals.

In some embodiments, the coded analog outputs can be decoded using CDMA codes to generate the decoded analog signals. For example, the integrated circuit can be configured to provide CDMA codes in the LO signal and the coded analog outputs can be decoded using the CDMA codes to generate decoded analog signals.

In some embodiments, the decoder elements are configured to perform analog discrete time analog processing on the coded analog outputs. For example, the decoder elements may include a plurality of sample and hold circuits and a weighted sum circuit, such as sample and hold circuits 86a-86n, 90a and weighted sum circuit 88 described above with respect to FIG. 3. The plurality of sample and hold circuits can receive an output of the mixer, generate a time signal and provide the time signal to the weighted sum circuit. The weighted sum circuit can be configured to generate signal that corresponds to a sum (e.g., average) of the coded analog outputs. In some embodiments, the output of the weighted sum circuit can be provided to another sample and hold circuit for further processing. The sample and hold circuit can generate the decoded analog signals.

In an embodiment, the decoder elements can be configured to recover individual BD element signals based on the originally received RF signals. These recovered individual BD elements can be provided to a plurality of weighting circuits, such as weighting circuits 40 described above with respect to FIG. 1. The weighting circuits may include phase-shifters or variable delays and attenuators. In an embodiment, the weighting circuits 40 can be configured to provide a variable weighting for an inputted decoded signal before summation in the a beamformer. The output of the weighting circuits can be provided to a plurality of beamformers, such as beamformers 44 described above with respect to FIG. 1.

At block 412, beam outputs corresponding to the decoded analog signals can be generated. A plurality of beamformers can be coupled to at least one output of a decoder element to receive the decoded analog signals. In some embodiments, each beamformer can be coupled to an output of two different decoder elements. The beamformers can be configured to generate beam outputs (e.g., beam outputs 48 described above with respect to FIG. 1) corresponding to the decided analog signals.

What is claimed:

1. An analog beamformer system comprising:
a plurality of analog encoders coupled to receive radio frequency (RF) signals and generate orthogonally coded analog signals;
a combiner having a plurality of input ports, each of the plurality of input ports coupled to at least one of the plurality of analog encoders, wherein the plurality of input ports are continuously electrically coupled to an output port of the combiner such that the orthogonally coded analog signals provided to the plurality of input ports are combined at the output port;
a divider to receive the combined orthogonally coded analog signals and generate a plurality of coded analog output signals; and
a plurality of analog decoders coupled to receive the plurality of coded analog output signals and generate decoded analog signals, wherein each of the analog decoders comprises:
a coding circuit capable of generating an orthogonal code at a first one of a plurality of output ports and an offset clock signal at each of second ones of the plurality of output ports;
a mixer having a first input port coupled to the first one of the plurality of output ports of said coding circuit and capable of receiving an orthogonally coded analog signal from said coding circuit, a second input port capable of receiving an orthogonally coded analog signal and an output port at which is provided a demodulated signal corresponding to a sum and difference of the orthogonally coded analog signals provided to the first and second input ports of the mixer;
a plurality of sample and hold circuits, each of the plurality of sample and hold circuits having a first input coupled to receive the demodulated signal from the output of the mixer and a second input coupled to a respective one of the second ones of plurality of output ports of the coding circuit so as to receive respective ones of the offset chip clock signals provided by said coding circuit, wherein each of the plurality of sample and hold circuits are configured to sample the demodulated signal received from the output of said mixer and hold the samples at a constant amplitude level for a period of time corresponding to the respective offset clock signal provided thereto by the coding circuit so as to provide at an output thereof a sample and hold signal corresponding to analog samples of decoded analog signals;
a summing circuit configured to receive and combine the decoded analog signals provided thereto from each of the sample and hold circuits and to provide a summed signal at an output thereof; and
a sample and hold circuit having a first input configured to receive a clock signal and a second input coupled to the output of said summing circuit so as to receive the summed signal from said summing circuit, wherein in response to the clock signal and the summed signal provided thereto, said sample and hold circuit provides a discrete time signal at an output thereof.

2. The system of claim 1, further comprising a plurality of antenna elements coupled to the plurality of analog encoders, wherein the plurality of antenna elements are configured to receive the RF signal, and wherein a predetermined number of the plurality of antenna elements are active.

3. The system of claim 2, wherein the predetermined number of active antenna elements corresponds to a number of beamformer elements and a number of beam outputs of the analog beamformer system.

4. The system of claim 1, wherein a total number of the plurality of analog encoders corresponds to a number of beamformer elements and a number of beam outputs of the analog beamformer system.

5. The system of claim 1, wherein each of the analog encoders is a bi-phase encoder.

6. The system of claim 1, wherein the first input port of each mixer is coupled to receive at least one RF signal and the second input port of each mixer is coupled to receive code division multiple access (CDMA) codes from the coding circuit, wherein the orthogonally coded signals are CDMA signals and the coding circuit is provided as an integrated circuit.

7. The system of claim 6, wherein the coding circuit generates orthogonal CDMA codes, and wherein the RF signals are coded based on the orthogonal CDMA codes.

8. The system of claim 1, further comprising a dowconverter module disposed between the combiner and the divider, wherein the dowconverter module is configured to receive the combined orthogonally coded analog signals from the combiner and convert the combined orthogonally coded analog signals to an intermediate frequency (IF) signal.

9. The system of claim 8, wherein the divider is configured to receive the IF signal from the downconverter module and generate the coded analog output signals based on the IF signal.

10. The system of claim 1, wherein each of the analog decoders comprises an analog discrete time analog processing encoder.

11. The system of claim 1, further comprising a weighting circuit disposed between the plurality of analog decoders and a plurality of beamformers elements, wherein the weighting circuit provides a variable weighting for the decoded analog signals before summation in the plurality of beamformers elements, and the plurality of analog beamformer elements are configured to generate beam outputs corresponding to the decoded analog signals.

12. A method for generating multiple beam feeds, the method comprising:
　receiving a plurality of radio frequency (RF) signals through a plurality of antenna elements, wherein a predetermined number of the plurality of antenna elements are active;
　encoding the RF signals through a plurality of analog encoders to generate orthogonally coded analog signals;
　combining the orthogonally coded analog signals by a combiner, the combiner having a plurality of input ports coupled to at least one of the plurality of analog encoders, wherein the input ports are continuously electrically coupled to an output port of the combiner such that the orthogonally coded analog signals provided to the input ports are combined at the output port;
　splitting the combined orthogonally coded analog signals into a number of coded analog output signals, wherein the number of coded analog output signals corresponds to the number of active antenna elements; and
　decoding the coded analog output signals to generate decoded analog signals, wherein the number of decoded analog signals corresponds to the number of active antenna elements, wherein decoding comprises:
　　generating, by a coding circuit, an orthogonal code at a first one of a plurality of output ports and an offset clock signal at each of second ones of the plurality of output ports;
　　receiving, by a mixer, at a first input port coupled to the first one of the plurality of output ports of said coding circuit, an orthogonally coded analog signal from said coding circuit, and at a second input port an orthogonally coded analog signal
　　generating, by the mixer, at an output port a demodulated signal corresponding to a sum and difference of the orthogonally coded analog signals provided to the first and second input ports of the mixer;
　　receiving, by a plurality of sample and hold circuits at a first input, the demodulated signal from the output of the mixer
　　receiving, by the plurality of sample and hold circuits at a second input coupled to a respective one of the second ones of plurality of output ports of the coding circuit, the offset chip clock signals provided by said coding circuit;
　　sampling, by each of the plurality of sample and hold circuits, the demodulated signal received from the output of said mixer and hold the samples at a constant amplitude level for a period of time corresponding to the respective offset clock signal provided thereto by the coding circuit so as to provide at an output thereof a sample and hold signal corresponding to analog samples of decoded analog signals;
　　combining, by a summing circuit, the decoded analog signals provided thereto from each of the sample and hold circuits to provide a summed signal at an output thereof;
　　receiving, by a sample and hold circuit, a clock signal at a first input and the summed signal from said summing circuit at a second input; and
　　generating a discrete time signal at an output of the summing circuit.

13. The method of claim 12, further comprising performing bi-phase modulation on the received RF signals.

14. The method of claim 12, further comprising modulating the RF signals using the code division multiple access (CDMA) codes.

15. The method of claim 12, further comprising encoding the RF signals using orthogonal code division multiple access (CDMA) codes.

16. The method of claim 12, further comprising converting the combined coded analog signals to an intermediate frequency (IF) signal.

17. The method of claim 16, further comprising receiving the IF signal and generating the coded analog outputs based on the IF signal.

18. The method of claim 12, further comprising performing analog discrete time analog processing on the coded analog outputs.

19. The method of claim 12, further comprising demodulating the coded analog outputs using code division multiple access (CDMA) codes.

20. The method of claim 12, further comprising performing sample and hold techniques on the decoded analog signals.

\* \* \* \* \*